Nov. 10, 1953
R. L. KYHL
2,659,028
TUNABLE MAGNETRON CIRCUIT
Filed Nov. 6, 1945

INVENTOR.
ROBERT L. KYHL
BY
William D. Hall,
ATTORNEY

Patented Nov. 10, 1953 2,659,028

UNITED STATES PATENT OFFICE 2,659,028

TUNABLE MAGNETRON CIRCUIT

Robert L. Kyhl, Cambridge, Mass., assignor, by mesne assignments, to the United States of America as represented by the Secretary of War Application November 6, 1945, Serial No. 627,037

2 Claims. (Cl. 315—39)

This invention relates to electrical apparatus and more particularly to radio frequency oscillators of the fixed-tuned type such as magnetrons.

An important object of the invention is to provide a suitable tuning means for varying the frequency of the output of a fixed tuned R. F. oscillator over a substantial range of frequencies. In fixed-tuned R. F. oscillators such as magnetrons, the resonant circuits are not readily adjustable directly.

A further object of the invention is to bring about this tuning with a minimum variation of the power output of the R. F. oscillator.

For a better understanding of the invention together with other and further objects thereof, reference is had to the following description, taken in connection with the accompanying drawing.

In the accompanying drawing forming a part of this specification:

Figures 1, 2:
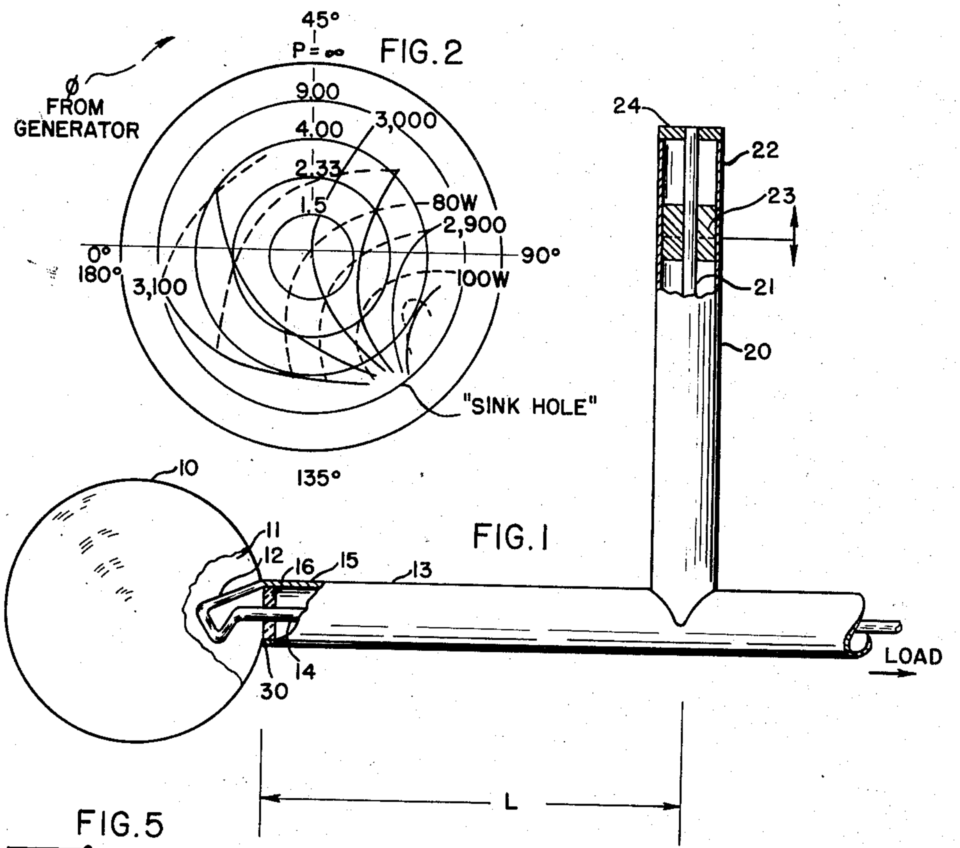
Fig. 1 is a simplified diagrammatic cut-away view of a magnetron oscillator embodying the invention.
Fig. 2 is a graph (on a Smith impedance chart) of the frequency and power characteristics of the magnetron of Fig. 1, and is known as a "Rieke diagram"

Referring to Fig. 1 the numeral 10 designates a radio frequency oscillator of the magnetron type having several individual cavities. A portion of one such cavity (i. e. 11) is shown. A coaxial transmission line 13 is coupled into cavity 11 by means of coupling loop 12 which connects the central conductor 14 of transmission line 13 to the outer conductor 15. The vacuum within magnetron 10 is maintained by insulating bead 16.

At an approximate length L (the determination of which will be described in detail hereinafter) from said coupling loop 12, a shunt section of coaxial-line tuning stub 20 is joined to coaxial transmission line 13. The range of variation of electrical length of tuning stub 20 is approximately one-half wavelength.

The central conductor 21 of tuning stub 20 may be short-circuited to the outer conductor 22 at any point along the length of tuning stub 20 by means of the movable short-circuiting plunger 23. Central conductor 21 is supported by the end piece 24 at the end of tuning stub 20.

The determination of the approximate length L may be performed in a number of ways.

One method for determining L involves the use of the Rieke diagram of Fig. 2.

The Rieke diagram is plotted on a Smith impedance chart.

As is well known, a Smith impedance chart is drawn in polar coordinates, the radius being a measure of the voltage standing wave ratio and the angle being a measure of the electrical length or phase angle to a point of minimum voltage. Thus, in Fig. 2, circles of constant voltage standing wave ratio, 1.5, 2.33, 4.00, 9.00 and infinity are shown as representative values of the radius. (For the voltage standing wave ratio equal to unity the circle becomes the central point of Fig 2.) Electrical phase angles of 45°, 90°, 135°, and 180° (or 0°) are shown.

The Rieke diagram for a given magnetron 10 and transmission line 13 is plotted on the Smith impedance chart in the following fashion:

Referring to the device shown in Fig. 1, varying loads are used to terminate the transmission line 13. For each load there will be a corresponding value of:

*a*. Voltage standing wave ratio along transmission line 13.

*b*. Electrical phase angle to a minimum voltage point along transmission line 13 measured from some fixed reference point, e. g. point 30 (Fig. 1).

*c*. Frequency of magnetron 10.

*d*. Power output of magnetron 10.

Values *a* and *b* determine a point on the Smith impedance chart. For each such point the corresponding frequency of the magnetron and the power output may be plotted. By joining the points of constant frequency and of constant power output a series of curves such as shown in Fig. 2 is obtained. The solid line curves are lines of constant frequency, here representing 2900 megacycles, 3000 megacycles and 3100 megacycles. The dashed lines represent lines of constant power output, of which the 80 watt and 100 watt lines are labeled.

The region of convergence of the frequency lines (and also approximately of the power lines), is known as the "sink hole."

Having produced a Rieke diagram as shown in Fig. 2, the distance L is the physical length corresponding to the electrical phase angle from the 0° line to the region of the sink hole (measured in the clockwise direction corresponding to the "from generator" direction on a standard Smith chart). In Fig. 2 this phase angle is approximately 120 degrees. To convert phase angle to L, it is necessary to multiply by $$\frac{\lambda}{360}$$

where $\lambda$ is the wavelength.

At the distance L from reference point 30 the entire Rieke diagram, Fig. 2, appears substantially rotated so that the sink hole appears at the 0° angle line.

Figure 3:
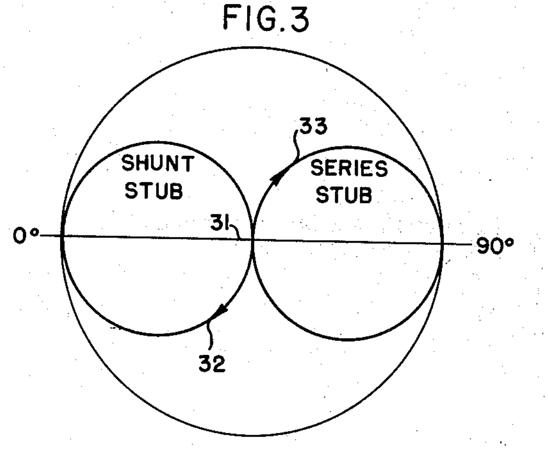
Fig. 3 shows the impedance curves on a Smith impedance chart of shunt and series tuning stubs when the main line is terminated in a matched load.

Fig. 3 illustrates the impedance (on a Smith impedance chart) of a variable short-circuited shunt stub across a line terminated in a matched load. The impedance variation (with increasing length of short-circuited stub), is in the direction from point 31 to point 32 on Fig. 3.

Superimposing the impedance variation due to the shunt stub as shown in Fig. 3, on the rotated Rieke diagram of Fig. 2, (after the sink hole has been rotated to the 0°—180° line), it is apparent that the variation of the magnetron frequency caused by tuning of the stub is a maximum, while variation of the power output (because of the approximate alignment of the tuning stub circle with the line of constant power) is a minimum.

In the event that a wave guide transmission line is used instead of coaxial transmission line 13, the procedure is analogous with some minor modifications. Since a wave guide is used, a series tuning stub is customary. For this case the series stub impedance circle (stub in series with matched line) is used (Fig. 3). The impedance variation is from point 31 to point 33 with increasing length of short-circuiting stub. In order to have the line of constant power more or less superimposed upon the tuning circle of the series stub, the sink hole of Fig. 2 is rotated to a maximum voltage point (that is to the 90° line). This corresponds (in Fig. 2) to an angle of approximately 30°.

Figure 4:
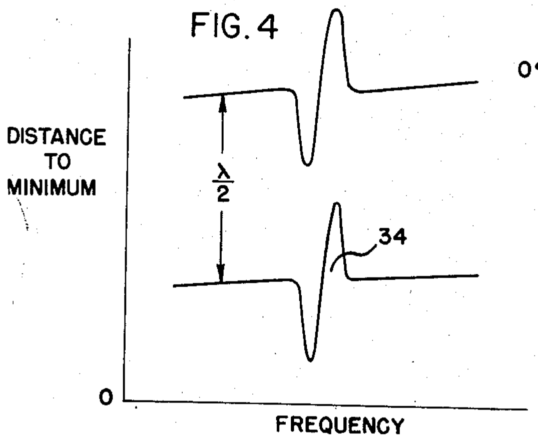
Fig. 4 is a graph of "distance to a minimum voltage point" vs. frequency and is obtained by feeding the transmission line and magnetron cavity by a variable-frequency signal generator placed at the "load" (Fig. 1)

An alternative method for determining the length L is to simply place a variable-frequency signal-generator at the "load" end of coaxial line 13 and to utilize the magnetron 10 as a cavity resonator rather than as an oscillator. A plot of the frequency of the signal generator as abscissa vs. distance to a minimum voltage point (e. g. from reference point 30) as ordinate is shown in Fig. 4. A slotted section of coaxial line may be used for this determination. The distance corresponding to the ordinate of point 34 is the distance L. The frequency at which the resonance loops of Fig. 4 occur is the resonance frequency of the magnetron 10.

In the event that wave guide transmission line and series stub are to be used instead of coaxial transmission line 13 and shunt stub 20, the procedure is the same except that distance to a maximum voltage point is the ordinate of Fig. 4.

Figure 5:
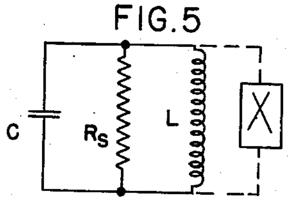
Fig. 5 shows an equivalent electrical circuit of Fig. 1.

The alternative method represented by the graphs of Fig. 4 is based on the assumption that at a minimum voltage point the equivalent electrical circuit of magnetron 10 is as shown in Fig. 5. At a minimum voltage point the magnetron may be represented as a parallel circuit of capacitance C, shunting resistance $R_s$ and inductance L, and will appear substantially as a short circuit or minimum voltage point at frequencies other than the resonant frequency.

If a shunt reactance X is coupled in at a minimum voltage point, it follows that only reactance X (no resistance component) will appear in shunt with the magnetron.

By coupling only a reactance component in parallel with the magnetron the frequency variation introduced by the stub tuner is made a maximum while the power output variation remains a minimum.

In a similar manner the equivalent circuit of magnetron 10 at a maximum voltage point would be a series L. C. circuit (i. e. substantially an open-circuit or maximum voltage point at frequencies other than the resonant frequency), and a series stub placed at a maximum voltage point would couple a series reactance into the magnetron circuit.

While there has been described what is at present considered to be the preferred embodiment of this invention it will be obvious that various changes and modifications may be made therein without departing from the scope of the invention.

What is claimed is:

1. A tunable radio frequency generator including a magnetron, a coaxial transmission line coupled to said magnetron and serving as the output line of said magnetron, a single adjustable short-circuited coaxial transmission line tuning stub shunting said coaxial transmission line at a point corresponding to the frequency convergence point of the Rieke diagram of said radio frequency generator, and means for adjusting the length of said tuning stub for changing the frequency output of said magnetron while maintaining substantially constant the power output thereof.

2. A tunable radio frequency generator including a fixed-tuned radio frequency oscillator, a radio frequency transmission line coupled to said oscillator and serving to conduct energy therefrom, and means for changing the output frequency of said oscillator while maintaining substantially constant the power output thereof comprising an adjustable tuning stub connected in shunt with said transmission line at a point corresponding to the frequency convergence point of the Rieke diagram of said radio frequency oscillator.

ROBERT L. KYHL.

References Cited in the file of this patent

UNITED STATES PATENTS

| Number | Name | Date |
|---|---|---|
| 2,144,222 | Hollmann | Jan. 17, 1939 |
| 2,373,233 | Dow et al. | Apr. 10, 1945 |
| 2,404,082 | Mouromtseff et al. | July 16, 1946 |
| 2,404,279 | Dow | July 16, 1946 |
| 2,408,410 | Clark | Oct. 1, 1946 |
| 2,410,840 | Samuel | Nov. 12, 1946 |
| 2,411,151 | Fisk | Nov. 19, 1946 |
| 2,418,518 | McArthur | Apr. 8, 1947 |
| 2,474,485 | Mason | June 28, 1949 |